(12) United States Patent
Loisel et al.

(10) Patent No.: US 11,115,210 B2
(45) Date of Patent: Sep. 7, 2021

(54) SYSTEMS AND METHODS FOR MASKING RSA OPERATIONS

(71) Applicant: Maxim Integrated Products, Inc., San Jose, CA (US)

(72) Inventors: Yann Yves Rene Loisel, La Ciotat (FR); Frank Lhermet, Roquevaire (FR); Jeremy Dubeuf, La Ciotat (FR)

(73) Assignee: Maxim Integrated Products, Inc., San Jose, CA (US)

( * ) Notice: Subject to any disclaimer, the term of this patent is extended or adjusted under 35 U.S.C. 154(b) by 339 days.

(21) Appl. No.: 16/039,014

(22) Filed: Jul. 18, 2018

(65) Prior Publication Data

US 2019/0044717 A1 Feb. 7, 2019

(30) Foreign Application Priority Data

Aug. 7, 2017 (FR) ...................................... 1757555

(51) Int. Cl.
*H04L 9/30* (2006.01)
*G06F 21/60* (2013.01)
(Continued)

(52) U.S. Cl.
CPC ............ *H04L 9/302* (2013.01); *G06F 21/602* (2013.01); *G09C 1/00* (2013.01); *H04L 9/002* (2013.01);
(Continued)

(58) Field of Classification Search
CPC ................................ H04L 9/302; G06F 21/602
(Continued)

(56) References Cited

U.S. PATENT DOCUMENTS 6,259,790 B1 * 7/2001 Takagi ..................... H04L 9/302
380/28
7,590,880 B1 * 9/2009 Hershman ............. G06F 21/755
380/203

(Continued)

FOREIGN PATENT DOCUMENTS

JP 4962165 B2 6/2006

OTHER PUBLICATIONS

Search Report, and English translation thereof, dated May 28, 2018, in French Patent Application No. 1757555 (16pgs).
(Continued)

*Primary Examiner* — Dant B Shaifer Harriman
(74) *Attorney, Agent, or Firm* — North Weber & Baugh LLP; Michael V. North

(57) ABSTRACT

Presented are systems and methods for protecting secret data that is stored in memory to prevent unauthorized access and data manipulation. Various embodiments may be applied to hide or mask an RSA exponent used for public key cryptography and stored in a cryptographic hardware block that uses a non-erasable working memory for computations. In certain embodiments, masking RSA exponents is accomplished by a two-step process that combines a specifically calculated, random and secret value with the secret exponent. The random value is stored in an erasable memory, such that in case of attack, both the erasable memory and the non-erasable memory do not leak any embedded secrets. The additional expenditure of memory resources only insignificantly affects system performance.

20 Claims, 3 Drawing Sheets

(51) Int. Cl.
*H04L 9/08* (2006.01)
*H04L 9/00* (2006.01)
*G09C 1/00* (2006.01)
*G06F 7/58* (2006.01)

(52) U.S. Cl.
CPC .......... *H04L 9/0869* (2013.01); *H04L 9/0894* (2013.01); *G06F 7/588* (2013.01); *G06F 2221/2143* (2013.01); *H04L 2209/046* (2013.01)

(58) Field of Classification Search
USPC .......................................................... 380/30
See application file for complete search history.

(56) References Cited

U.S. PATENT DOCUMENTS

| | | | | |
|---|---|---|---|---|
| 9,335,967 | B1* | 5/2016 | Huffman | G06F 7/483 |
| 9,544,130 | B2 | 1/2017 | Teglia | |
| 2005/0069135 | A1* | 3/2005 | Brickell | H04L 9/3234 |
| | | | | 380/277 |
| 2007/0177720 | A1* | 8/2007 | Bevan | H04L 9/0618 |
| | | | | 380/28 |
| 2009/0016523 | A1* | 1/2009 | Dupaquis | H04L 9/3066 |
| | | | | 380/28 |
| 2011/0007894 | A1* | 1/2011 | Takenaka | G06F 7/723 |
| | | | | 380/28 |
| 2012/0106732 | A1* | 5/2012 | Teglia | H04L 9/06 |
| | | | | 380/28 |
| 2013/0077790 | A1* | 3/2013 | Kawabata | H04L 9/003 |
| | | | | 380/277 |
| 2013/0265163 | A1* | 10/2013 | Joyce | G06F 21/86 |
| | | | | 340/551 |
| 2014/0016776 | A1* | 1/2014 | Van Foreest | H04L 9/0869 |
| | | | | 380/46 |
| 2014/0143883 | A1* | 5/2014 | Shen-Orr | G06F 21/60 |
| | | | | 726/26 |
| 2015/0063561 | A1* | 3/2015 | Teglia | H04L 9/003 |
| | | | | 380/28 |
| 2016/0162295 | A1* | 6/2016 | Lee | G06F 9/3853 |
| | | | | 712/220 |
| 2016/0323114 | A1* | 11/2016 | Sulpizio, Jr. | H04L 63/0272 |
| 2018/0018147 | A1 | 1/2018 | Sugawara | |

OTHER PUBLICATIONS

Clavier C. et al., "Universal 1 Exponentiation Algorithm a First Step Towards Provable Spa-Resistance," Cryptogrpahic Hardware and Embedded Systems, 3rd International Workshop, CHES 2001, Paris, France, May 14-16, 2001; Proceedings; [Lecture Notes in~Computer Science], Berlin:Springer, DE, vol. 2162, May 14, 2001 (May 14, 2001), pp. 300-308, XP001061170, ISBN: 978-3-540-42521-2 (10pgs).

Donald L Evans et al., "FIPS PUB 140-2 Change Notices (Dec. 3, 2002) Security Requirements for Cryptographic Modules Category: Computer Security Subcategory: Cryptography," Mar. 12, 2002, XP055142285, Extract from the Internet: URL: http://csrc.nist.gov/publications/fips/fips 140-2/fips1402.pdf, [Retrieved Sep. 24, 2014] (70pgs).

Notice of Allowance dated Jun. 9, 2020, in related French Patent Application No. 1757555, (2 pgs).

* cited by examiner

SYSTEMS AND METHODS FOR MASKING RSA OPERATIONS

CROSS-REFERENCE TO RELATED APPLICATIONS

This application claims foreign priority under 35 U.S.C. § 119, to French Patent Application No. 1757555, entitled "SYSTEMS AND METHODS FOR MASKING RSA OPERATIONS," naming as inventors, Yann Yves Rene Loisel, Frank Lhermet, and Jeremy Dubeuf, and filed Aug. 7, 2017, which application is hereby incorporated herein by referende in its entirety.

TECHNICAL FIELD

The present disclosure relates to secure systems and methods for executing an asymmetrical cryptographic method, and more particularly, to systems and methods that preserve data confidentiality and authentication by providing a countermeasure against attacks on devices that utilize Rivest-Shamir-Adleman (RSA) operations.

DESCRIPTION OF THE RELATED ART

RSA public key cryptography is known to present a great hurdle to potential attackers of encrypted data due to the enormous task of factoring the product of two large, secret prime numbers. Like any other form of cryptography, RSA is not immune to attacks and or unwanted access or inspection by potential attackers. Therefore, various computer security standards, such as FIPS 140-2 used, e.g., for postal modules or PCI PTS used, e.g., for payment terminals, require the erasure of confidential data immediately following the detection of indicia of a tampering attempt with a cryptographic hardware device. In general, while for certain types of attack, such as side-channel attacks, there exist countermeasures that protect a trusted environment, there are no known solutions that provide a satisfactory level of protection against more invasive attacks, such as those aimed at intruding memory either by physical means or embedded software means. Especially in the field of RSA public key cryptography, common software-based erasure mechanisms cannot be relied upon for compliance with security standards when faced with such invasive attacks.

FIG. 1 illustrates a conventional system and method for protecting confidential data stored in memory. System 100 comprises Modular Arithmetic Accelerator (MAA) 102 that, typically, is a hardware device similar to a co-processor that has its own resources and provides support for mathematical computations. MAA 102 is oftentimes used for public key cryptography, which is demanding in terms of computing power, especially where software implementations are not powerful enough.

MAA 102 comprises registers and memory 106, e.g., SRAM, that receives operands, performs calculations, and outputs a result, e.g., a message m. As depicted in FIG. 1, MAA 102 is coupled to Non-Volatile Secure Random Access Memory (NVSRAM) 110 that, in operation, loads secret 104 into memory 106 of MAA 102, such that MAA 102 can calculate message m therefrom.

In case of an attack on system 100, software erase command 130 is issued, e.g., by a tampering detection system, and communicated to NVSRAM 110, such that any secret present in memory 114 can be cleared or erased to prevent unauthorized access to confidential data. However, in existing designs, such as system 100, memory 106 of MAA 102 cannot be erased in a timely fashion, because, by design, there exist no mechanisms or security features, whether in hardware or software, that can be relied on to perform a sufficiently rapid, complete, and guaranteed erasure of MAA memory 106. In part, this is due to the generally large memory region of memory 106. As a result, computations that have been performed and stored within MAA memory 106 and comprise any type of secret, remain within MAA memory 106 and leave confidential information vulnerable to access by potential attackers.

As an example, an attacker who can manage to issue a sufficiently fast reset command that interrupts the software-based erasure mechanism, for example, by interfering with the scheduling of the Non-Maskable Interrupt (NMI) handler to prevent the execution or completion of the interrupt, may gain access to the to-be-protected secret in MAA memory 106. Consequently, any attempt to comply with standards that require immediate erasure from memory that comprises confidential data may thus be thwarted by a successful attack.

Given that memory 106 cannot be timely erased in the event of a tampering attempt that has been detected, in order to comply with applicable security and certification standards, it would, therefore, be desirable to have systems and methods in place that allow the use of an MAA while, at the same time, ensuring that no inadvertent exposure of secrets contained therein will occur.

Therefore, what is needed are systems and methods that overcome these shortcomings and can withstand various types of physical and software attack.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE EMBODIMENTS

Figure 1:
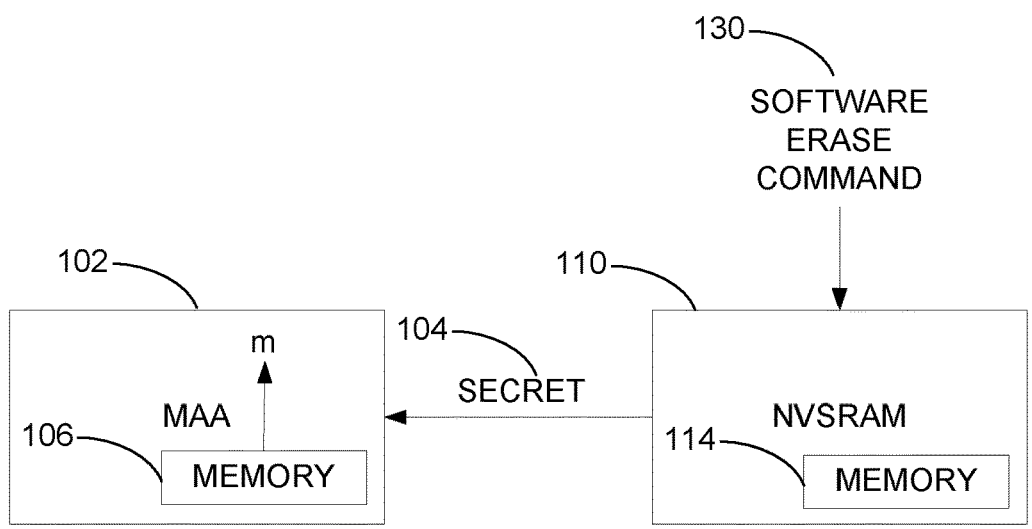
FIG. 1 illustrates a conventional system and method for protecting confidential data stored in memory.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that embodiments described herein are given in the context of secure microcontrollers, but one skilled in the art shall recognize that the teachings of the present disclosure are not limited to any type of microcontroller and may equally be may be of interest to any software provider who wants to use IP protection services in other contexts and applications.

As used herein, the term "non-volatile memory" refers to an electrical data storage device, such as flash memory, that retains its state after power is removed. The terms "memory" and "physical memory" are used interchangeably and refer to an electrical data storage device that offers memory writes and reads, as opposed to virtual or logical memory that is defined by software or a processor. The terms "processor" and "microcontroller" are also used interchangeably, referring to an electric circuit that performs one or more data processing and/or control operations. Similarly, the terms "buffer" and "memory" refer to regions physical memory that may include one or more storage locations addressable by physical addresses.

Embodiments herein disclose methods for protecting confidential data. A method may comprise receiving a secret value and a random value, e.g., a integer values; adding, at a secure device, the random value to the secret value to obtain a masked value; storing the masked value in a non-secure memory that is external to the secure device; using the masked value to compute an intermediate value; erasing the masked value from the non-secure memory, such that in the event of an attack neither one of secret value and the first random value can be recovered from the non-secure memory; loading an exponent value into the non-secure memory; and using the intermediate value and the exponent value to compute a final value, e.g., to calculate the secret value using an RSA operation.

In embodiments, the exponent value may have been generated in a manner such that a sum of the exponent value and the random value equals zero modulus $\varphi(n)$, wherein n represents a public key. The exponent value may have a bit length that is half of the bit length of the random value that may have been generated by a random value generator and may have the same bit length as the public key. In certain embodiments, in response to a signal being received, such as a signal indicative of one of a software or a hardware attack, the secret value and the random value may be erased from the secure device.

Some embodiments disclose a system for protecting confidential data that comprises a processor and a non-transitory computer-readable medium that comprises sequences of instructions that when executed by the processor, cause the following steps to be performed: receiving a secret value and a random value; at a secure device, adding the random value to the secret value to obtain a masked value; storing the masked value in a non-secure memory, the non-secure memory being external to the secure device; using the masked value to compute an intermediate value; erasing the masked value from the non-secure memory, such that in the event of an attack neither one of secret value and the first random value can be recovered from the non-secure memory; loading an exponent value into the non-secure memory; and using the intermediate value and the exponent value to compute a final value from which the secret value may be derived.

Figure 2A:
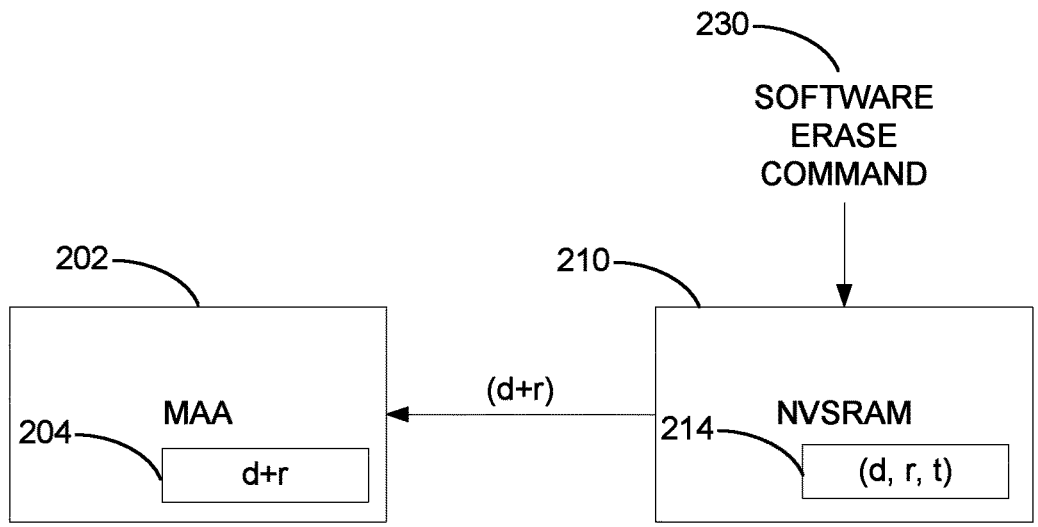
FIGS. 2A and 2B illustrate systems for protecting confidential data stored in memory to prevent unauthorized access and data manipulation, according to various embodiments of the present disclosure.
Figure 2B:
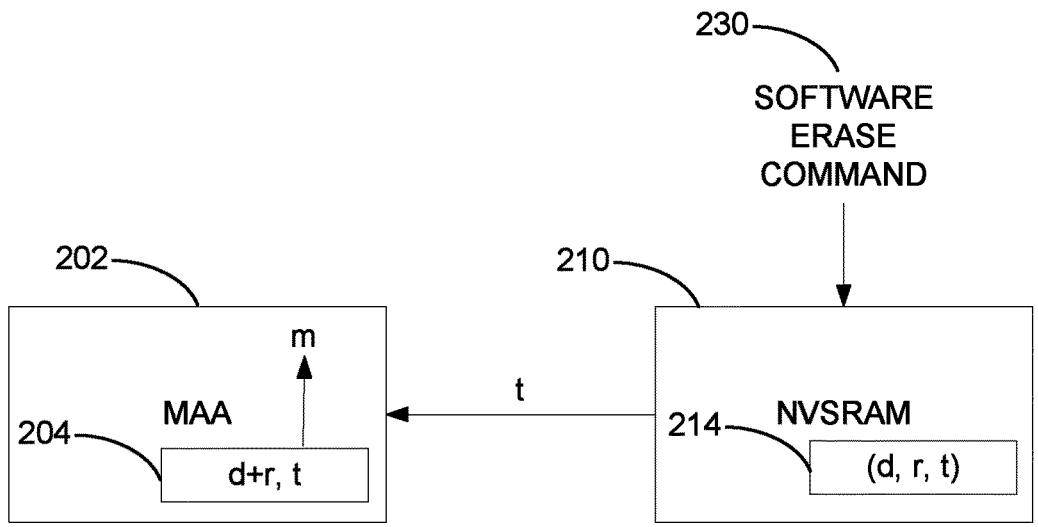

FIGS. 2A and 2B illustrate systems for protecting confidential data stored in memory to prevent unauthorized access and data manipulation, according to various embodiments of the present disclosure. Components similar to those shown in FIG. 1 are labeled in a similar manner. For purposes of brevity, a description or their function is not repeated here.

In operation, in embodiments, NVSRAM 210 in FIG. 2A adds a random value, r, e.g., an integer, to a master secret value, d, e.g., another integer representing a private key exponent value, to obtain the sum, d+r, that may be stored in NVSRAM 210. In embodiments, this sum is made available to MAA 202, e.g., for storage in memory 204. In embodiments, MAA 202 is a non-secure device that may use the sum in an RSA exponentiation to generate a message, m, e.g., by using equation $a=m^{d+r}$ mod n.

In embodiments, the sum of d and r may be erased from MAA 202 or otherwise invalidated, e.g., by overwriting the result with zeroes, such the sum of d and r is no longer retrievable from memory 204. This sum, in effect, masks the secret value d within MAA 202 since knowledge of the sum of random value r and master secret d in MAA 202 provides no information about the individual values of d and r, as illustrated by the following simplified example: Assuming an RSA algorithm or any comparable asymmetrical encryption method uses the exemplary compound number, 5, that has been assembled using two individual numbers, d and r, recovering from MAA 202 the compound value 5, i.e., the sum of individual integers d and r, will therefore not provide any useful information as to whether the value of number d is 2 and the value of number r is 3, or whether the value of d is 1 and r is 4, and so on.

In embodiments, once the sum of d and r is erased from MAA 202 and, thus, no longer retrievable from MAA 202, parameter, t, referenced in FIG. 2B, is loaded from NVSRAM 210 into MAA 202. As a result, t and the sum of d and r are not present in a nonsecure device at the same time, such that the confidential value d cannot be recovered (e.g., from equation d+r+t=d).

In embodiments, NVSRAM 210 is a memory device that can hold a secret and is capable of being instantly and fully erased in the event of detection tampering. NVSRAM 210 is cleared or reset (e.g., all registers may be set to zero) in response to alarm signal 230, that may be any type of software erase command. In embodiments, in case of detection (e.g., via tamper sensors, environmental sensors, etc.) of an attack on any part of system 200, software erase command 230 may be issued and communicated to NVSRAM 210, such that any existing confidential value, in particular values t and r, can be automatically cleared from memory 214 to prevent unauthorized access to confidential data. In particular, random value r, (i.e., a means to recover master secret value d (e.g., from the sum of d and r) may be erased from NVSRAM 210 prior to t being loaded into MAA memory 204. It is understood that alarm signal 230 may be any trigger signal that may be activated by any type of device, e.g., a motion sensor, in response to detecting any indicia of a tampering event.

In short, while knowledge of random value r may be useful to an attacker in an attempt to recover master secret d, the value r is safely stored in NVSRAM 210 and never exposed (by itself) within unsecure memory of MAA 202; and knowing the sum of d and r provides no insight into the individual values d or r, such that both values are considered secure. Similarly, knowledge of secret t alone without knowledge of secret r will not be of use to an attacker, as the sum of t and r provides no information about the individual values of t and r. In addition, to MAA memory 204 not leaking any embedded secrets, in case of an attack, random value r is erased from NVSRAM memory 214.

In summary, when used in an RSA algorithm, the master secret d is never exposed within MAA memory 204, and no other information within MAA memory 204 will be useful for a potential attacker in an attempt to retrieve the secret d. Nor will any other values within MAA memory 204 be useful in retrieving the secret d, such that an attacker cannot benefit, for example, from a recovery (dump) of the cryptoblock memory.

In embodiments, parameter t is generated in an initialization step, e.g., as a 1024-bit number and stored in NVSRAM 214. Since RSA computation times are relatively sensitive to data size, in embodiments, the length of t is chosen one half of the key length (2048-bit or 4096-bit) of modulus n. Advantageously, this allows for a not too time consuming countermeasure. In fact, the computation time for t is thus rather insignificant when compared with the computation time for the key itself, thereby, imposing only a relatively small additional computational cost.

In detail, the cost of $m^t$ exponentiation is small compared to the cost of $m^{d+r}$ exponentiation, which, in turn, is comparable to the exponentiation used in conventional RSA algorithms (e.g., when computing $m^d$ mod n). Nevertheless, in order to prevent discovery of secrets by attacks that use brute force methods, e.g., by applying the raw computing power of a computer to find t from a (known as the discrete logarithm problem), it is recommended that the length of parameter t be chosen not too short. A length of 1024-bit is considered to be a sufficiently secure trade-off in size for the purpose of defeating such attacks while, at the same time, not placing too much of a computing burden on system 200/250.

Figure 3:
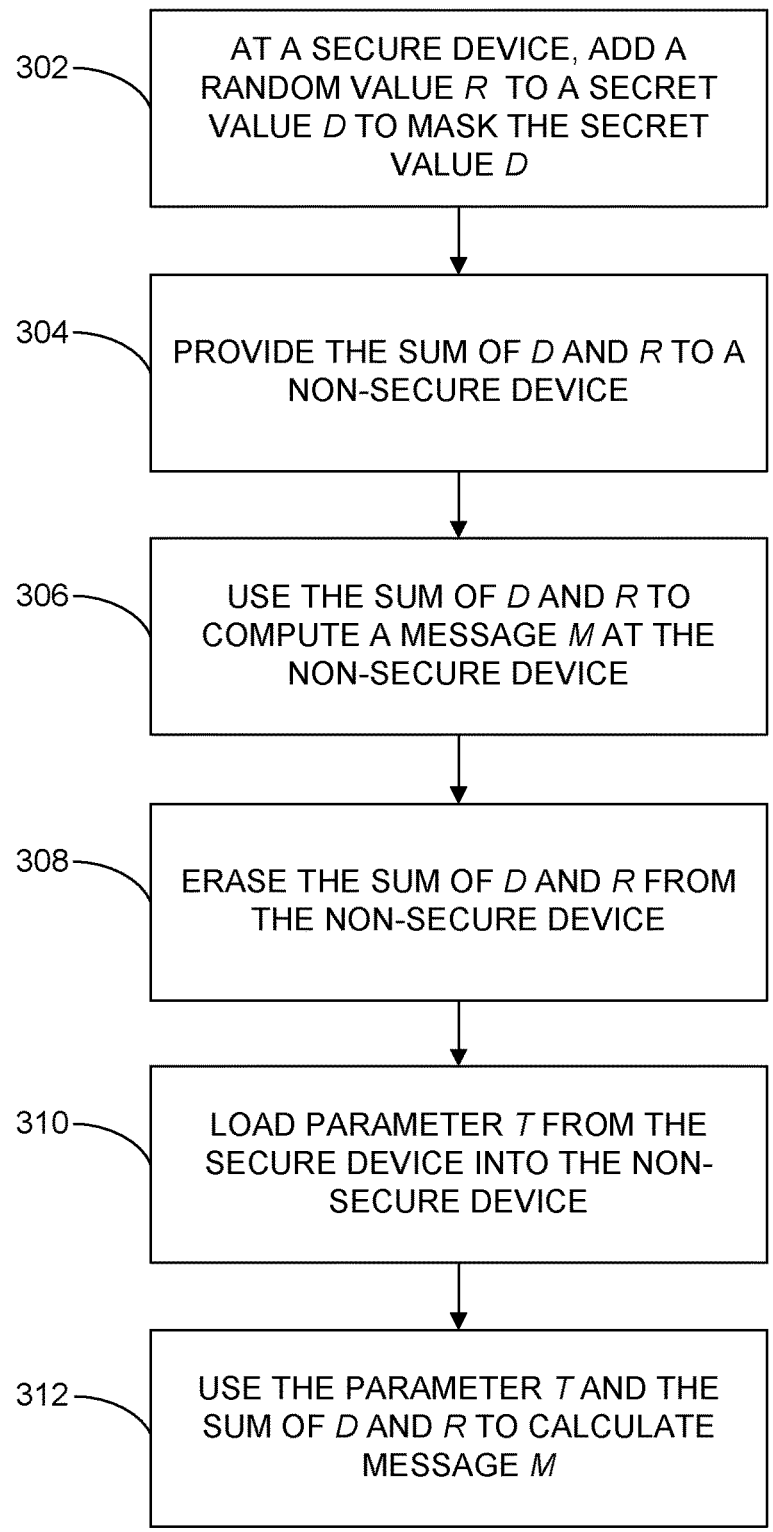
FIG. 3 is a flowchart of an illustrative process for protecting confidential data in accordance with various embodiments of the present disclosure.

FIG. 3 is a flowchart of an illustrative process for protecting confidential data in accordance with various embodiments of the present disclosure. Process 300 begins at step 302 when, at a secure device, such as a NVSRAM that comprises non-volatile memory, a random value, r, is added to a secret value, d, e.g., to mask the secret value d. In embodiments, values r and d are integers.

At step 304, the sum of d and r is provided to a non-secure device, e.g., an MAA that comprises its own memory, where the sum may be stored prior to further processing. In embodiments, the effect of steps 302 and 304 is that neither of values d and r has to be individually loaded into the non-secure device. As previously mentioned, knowing the sum of d and r provides no insight into the individual values d or r, such that both values may be considered secure.

At step 306, the sum of d and r is used to compute a message, m, at the non-secure device. In embodiments, computing the message m involves using equation $a=m^{d+r}$ mod n as part of a modified RSA algorithm.

At step 308, the sum of d and r is erased from the non-secure device, such the sum of d and r is no longer retrievable from the non-secure device.

At step 310, a parameter, t, is loaded from the secure device into the nonsecure device, such that once the sum of d and r is no longer retrievable from the nonsecure device, t and the sum of d and r are not concurrently present in the nonsecure device. As one result, the secret value d cannot be recovered.

Finally, at step 312, the parameter t and the sum of d and r are used to calculate the message m, for example, by using the properties of exponentiation, such as $c^{(a+b)}=c^a*c^b$, and modular arithmetic to compute a value m from equation $b=a*m^t$ mod n, which also equals $m^d$ mod n. Using modular arithmetic and Euler's theorem it can be shown that $b=m^{d+r} \cdot m^t$ mod $n=m^{d+r+t}$ mod $n=m^{d+k \cdot \varphi(n)}$ mod $n=m^d \cdot m^{k \cdot \varphi(n)}$ mod $n=m^d$ mod n.

In embodiments, step 302 may be preceded by an initialization step that uses, e.g., modular arithmetic, to calculate the value r such that the product of a variable t and value r equals zero modulus $\varphi(n)$ (i.e., t+r=0 mod $\varphi(n)$). Generally, $\varphi(n)$ equals $(p-1)*(q-1)$, such that for an RSA keypair, the modulus of the public key n equals the product p*q, with p and q being two prime numbers that due to the factorization problem cannot be easily recovered. The calculated value r may then be stored, e.g., in the non-volatile memory of NVSRAM.

As a result, if an attack is detected at any step involving steps 302 through 306, t and r will be erased from the NVSRAM, such that an attacker cannot recover d from the sum of d and r. And because, at step 308, the sum of d and r is erased from the memory of non-secure device, if an attack occurs at any of steps 310 or later, the sum of d and r will no longer be present in the NVSRAM, such that d will not be available, and the secret data is protected.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for protecting confidential data, the method comprising:
    receiving a secret value and a random value;
    at a secure device, adding the random value to the secret value to obtain a masked value;
    storing the masked value in a non-secure memory, the non-secure memory being external to the secure device;
    using the masked value to compute an intermediate value;
    erasing the masked value from the non-secure memory, such that in the event of an attack neither one of the secret value and the random value can be recovered from the non-secure memory;
    loading an exponent value into the non-secure memory; and
    using the intermediate value and the exponent value to compute a final value.

2. The method according to claim 1, wherein the secret value and the random value are integers.

3. The method according to claim 1, further comprising, in response to a signal being received, erasing the secret value and the random value from the secure device.

4. The method according to claim 3, wherein the signal is indicative of one of at least one of a software attack and a hardware attack.

5. The method according to claim 1, wherein the exponent value has been generated such that a sum of the exponent value and the random value equals zero modulus $\varphi(n)$, wherein n represents a public key.

6. The method according to claim 5, wherein the exponent value has a bit length that is half of the bit length of the random value.

7. The method according to claim 5, wherein the random value has the same bit length as the public key.

8. The method according to claim 1, wherein the random value has been generated by a random value generator.

9. The method according to claim 1, further comprising using the final value to calculate the secret value.

10. The method according to claim 9, wherein calculating the secret value comprises using an RSA operation.

11. A system for protecting confidential data, the system comprising:
    one or more processors; and
    a non-transitory computer-readable medium or media comprising one or more sequences of instructions which, when executed by at least one of the one or more processors, causes steps to be performed comprising:
        receiving a secret value and a random value;
        at a secure device, adding the random value to the secret value to obtain a masked value;
        storing the masked value in a non-secure memory, the non-secure memory being external to the secure device;
        using the masked value to compute an intermediate value;
        erasing the masked value from the non-secure memory, such that in the event of an attack neither one of the secret value and the random value can be recovered from the non-secure memory;
        loading an exponent value into the non-secure memory; and
        using the intermediate value and the exponent value to compute a final value from which the secret value may be derived.

12. The system according to claim 11, wherein the secret value and the random value are integers.

13. The system according to claim 11, further comprising, in response to a signal being received, erasing the secret value and the random value from the secure device.

14. The system according to claim 13, wherein the signal is indicative of one of at least one of a software attack and a hardware attack.

15. The system according to claim 11, wherein the exponent value has been generated such that a sum of the exponent value and the random value equals zero modulus $\varphi(n)$, wherein n represents a public key.

16. The system according to claim 15, wherein the exponent value has a bit length that is half of the bit length of the random value.

17. The system according to claim 15, wherein the random value r has the same bit length as the public key.

18. The system according to claim 11, wherein the random value has been generated by a random value generator.

19. The system according to claim 11, further comprising using the final value to calculate a secret value.

20. The system according to claim 19, wherein calculating the secret value comprises using an RSA operation.

* * * * *